Dec. 31, 1963   J. J. MULLER   3,115,816
STEREOSCOPIC CAMERA
Filed Jan. 10, 1961
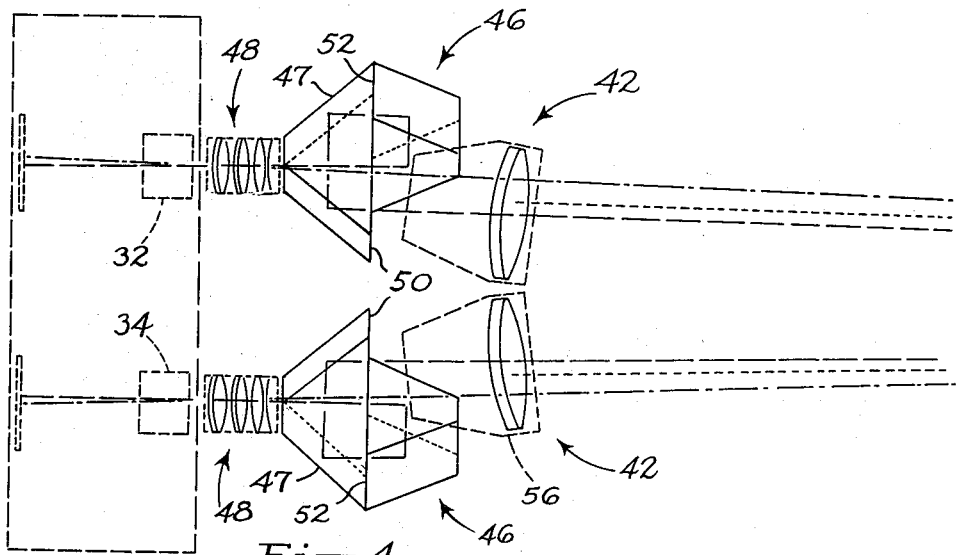
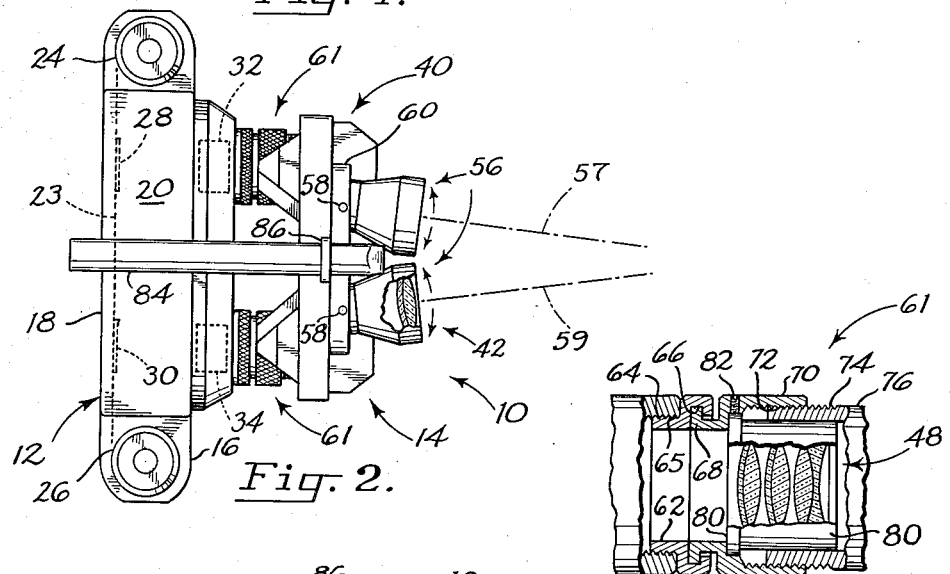
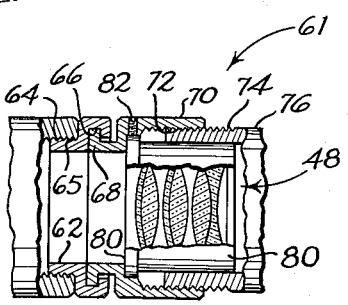
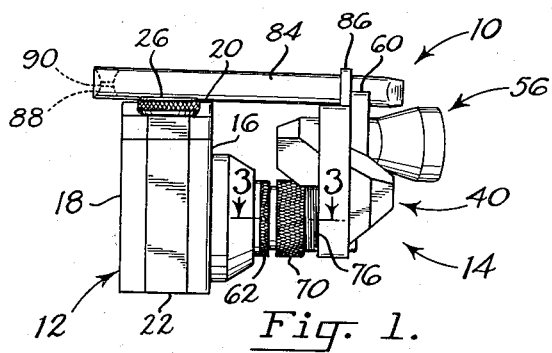
Jan J. Muller
INVENTOR.
BY Ramsey and Kolisch
Attys.

United States Patent Office 3,115,816
Patented Dec. 31, 1963

3,115,816
STEREOSCOPIC CAMERA
Jan J. Muller, 6500 SW. Hamilton Way, Portland, Oreg.
Filed Jan. 10, 1961, Ser. No. 81,713
3 Claims. (Cl. 95—18)

This invention relates to stereoscopic cameras, and more particularly to an improved construction for a stereoscopic camera, enabling the camera to take clear, stereoscopically related pictures of objects relatively close to the camera.

Stereoscopic cameras are used to produce mating pictures, that when properly viewed together give the illusion of three dimensions. The usual camera has a pair of matched camera lenses, with the axes of the lenses spaced apart a distance approximately corresponding to the interocular separation of the eyes. When the shutters of these lenses are actuated, a pair of pictures are produced by the action of the lenses on light-sensitive film that give a three dimensional effect when each is viewed by a separate eye.

An important consideration in producing stereoscopic pictures is the separation of the fields viewed by the two camera lenses. The stereo base line or extremes from which pictures are taken, in a camera having matched camera lenses spaced a fixed distance apart, is the interaxial separation of the lenses. While such a separation is satisfactory for pictures taken at some distance, the separation produces unsatisfactory results when close-ups are taken. For one thing, an unnatural stereoscopic effect is produced because of the extreme angles at which light from an object passes through the pair of lenses of the camera onto the picture-taking areas therebehind. Further, there is a tendency for the images produced by the two camera lenses to fall outside the film areas of the camera, so that the pictures resulting are poorly centered.

In certain uses of stereoscopic cameras, it is not only desirable to take close-up pictures, but it is also advantageous to take directly a somewhat enlarged picture. Thus, in the fields of dentistry and medicine, in certain fields of research, and when solving special industrial problems, close-up stereoscopic pictures with sufficient enlargement to produce clear detail are most helpful. Such pictures can be viewed through a proper viewer, and studied conveniently at any time, with full illustration of the matter photographed.

Thus, a general object of the invention is to provide an improved construction for a stereoscopic camera, featuring novel means for shortening the stereo base line of the camera when taking close-ups. The camera is relatively simple, and produces good stereoscopic pictures at distances of substantially less than five feet.

Another object is to provide an improved stereoscopic camera for taking pictures at close range, which provides for adjustment in the stereo base line and also produces enlargement of the picture images photographed.

Another object is to provide a stereoscopic camera which includes a pair of objective lenses as part of the lens system for the camera, and means mounting the objective lenses whereby their separation may be adjusted, together with the angle of regard of the lenses. When taking close-ups, the objective lenses are brought together, and the axes of the lenses converge on each other.

A more specific object is to provide an improved camera having spaced camera lenses which also includes, for each camera lens, a lens system comprising an objective lens and a magnifier lens, and between these prism means effective to transmit light from the objective lens to the magnifier lens. The prism means enables a shortening of the distance between the two lenses. In a preferred embodiment of the invention, the prism means between the objective lens and magnifier lens takes the form of a Porro prism assembly, and upright, nonreversed images are produced by the magnifier lens.

Another object is to provide an improved stereoscopic camera for taking close-ups which is not bulky, and which may be easily moved by an operator into proper position for picture taking.

A still further object is to provide a lens system for a stereoscopic camera enabling it to take close-ups, which is detachable so that the camera may be used in a conventional manner while taking pictures at long range.

Other objects and advantages will become apparent as the following description is read in conjunction with the accompanying drawings, wherein:

FIG. 1 is a side view of a stereoscopic camera constructed according to an embodiment of this invention;

FIG. 2 is a top view of the camera illustrated in FIG. 1;

FIG. 3 is a view, somewhat enlarged, taken along the line 3—3 in FIG. 1; and

FIG. 4 is a schematic optical diagram, showing the operation of lens system camera.

Referring now to the drawings, and with particular reference to FIGS. 1 and 2, the stereoscopic camera is indicated generally at 10. The camera comprises, at the left of the figures, a camera box 12 and mechanism for holding a strip of film and suitably exposing it to light, and at the right of the figures, a prism and lens system indicated generally at 14. As expected in a stereoscopic camera, light travels along two paths through prism and lens system 14 into camera box 12, as will be hereinafter described.

Considering first camera box 12, this is substantially rectangular in shape, and includes front and rear walls 16, 18, and top and bottom walls 20, 22. These are all joined together, so that the inside of the camera box is completely closed off from outside light. During operation of the camera, a strip of film 23 extends between the opposite ends of the camera box, and this has its ends wrapped around the usual film reels, connected to reel knobs 24, 26. Between the film reels, the film passes over a pair of picture-taking areas within the camera box, such being indicated generally by the dashed outlines in FIG. 2 and reference numerals 28, 30. Disposed directly in front of each picture-taking area is the usual camera lens equipped with a shutter, indicated by the dashed outlines numbered 32, 34 in FIG. 2. The pair of camera lenses and their shutters are matched, and are conventional in construction. Thus, each lens may be the usual compound corrected lens, and each shutter the usual mechanical device that is actuated momentarily to allow light to pass through the lens. The picture-taking areas, lenses and shutters are not described in detail, as these are well-known components of cameras, and their specific constructions are not necessary for an understanding of the invention.

Considering now prism and lens system 14 provided to the right of camera box 12 in FIGS. 1 and 2, this comprises a housing means 40, and mounted within the housing means (reference is now made to FIG. 4) a pair of objective lenses 42, to the rear of each objective lens 42 a pair of prisms 46, 47, and to the rear of each pair of prisms and directly in front of each camera lens a magnifier lens 48. During the taking of a close-up picture, light travels in two paths to the camera lenses, and in each path light encounters an objective lens, a pair of prisms, a magnifier lens, and a camera lens, in that order, whence it travels to one of the picture-taking areas 28, 30 within the camera box.

Each objective lens 42 in the embodiment illustrated takes the form of the usual compound lens found as an objective, for instance, in a conventional pair of binoculars. An objective lens 42 forms an image of the object being photographed, and this is magnified by the magnifier lens in the optical path to the rear of the objective lens.

Each pair of prisms 46, 47 to the rear of each objective lens comprises a pair of right-angled prisms, with hypotenuse faces overlapped. The prisms are arranged so that a beam of light entering the hypotenuse face of prism 47 (such being indicated at 50 and constituting the front face of the pair of prisms or prism means behind an objective) is totally reflected twice before emerging at the same face and entering the hypotenuse face of prism 46, indicated at 52 (referred to as the rear face of the pair of prisms). In the second prism, the light is again reflected twice, before leaving face 52. Such an organization of prisms is known as a Porro prism assembly. As will be seen with reference to the drawings, the front face 50 of each pair of prisms is offset and spaced inwardly from the rear face 52, so that a beam of light enters a pair of prisms at a point spaced inwardly on the camera from where the beam leaves the pair of prisms and passes through a camera lens.

Each magnifier lens 48 is a compound corrected lens, such as is found in a pair of binoculars or a telescope. A magnifier lens 48, like the ocular of a telescope, forms an enlarged image of the image formed by the lens preceding it.

With reference now to FIGS. 1 and 2, housing means 40 comprises a pair of housing parts 56, and each mounts an objective lens 42. Each housing part is pivotally mounted by a pivot connection 58 on a transverse plate 60 that is part of housing means 40. Pivot connections 58 enable the housing parts 56 to be swung about parallel axes toward and away from each other, as indicated by the arrows in FIG. 2. The pivot connections are located to the rear of the objective lenses, and thus on pivotal movement of the housing parts toward each other, the objective lenses are swung inwardly in arcs to positions directly adjacent each other. At the same time that the objective lenses are swung toward each other, their angles of regard are shifted, as their center axes (such being indicated in FIG. 2 at 57, 59) converge on each other in front of the camera with the lenses swung inwardly.

Considering further housing means 40, the housing means is connected to camera box 12 by a pair of housing parts 61 to the rear of the two pairs of prisms. With reference to FIG. 3, and describing one of the housing parts, each comprises an annular member 62 with an externally threaded portion 64 screwed within the usual internally threaded portion 65 provided a camera box outside a camera lens to enable the attachment of auxiliary lenses to the camera. Annular member 62 has an annular groove 66 provided around the interior thereof, and this fits about an annular flange 68 that is part of a rotatable adjustor cylinder 70. Thus, annular member 62 and adjustor cylinder 70 are held together, but are relatively rotatable. Adjustor cylinder 70 is internally threaded at 72, and screwed onto an externally threaded portion 74 of a cylindrical section 76 which is joined with the center portion of housing means 40 that encases the Porro prism assemblies. A magnifier lens is supported by the housing part, and this is carried in a mounting 80 fastened within the adjustor cylinder 70 as by screws 82. Thus, telescopic means, comprising cylinder section 76 and its threaded portion 74 and the rotatable adjustor cylinder 70 and its internally threaded portion 72, is provided to enable movement of the magnifier lens toward and away from the prism in front of it. This adjustment is used in focusing the camera. Annular members 62 detachably connect the prism and lens system 14 to the camera box.

For a view finder, in the embodiment of the invention illustrated, there is provided an elongated tube 84 joined to plate 60 of housing means 40 by a bracket 86 which has the tube extending therethrough. The tube inclines downwardly at its forward end somewhat. The forward end of the tube (the right end in the figures) is shaped to have a square cross section. Thus, a square outline is presented to the eye when looking through the interior of tube 84. At the left end of the tube and mounted within it is a plug 88 with a peephole 90 therein. An object to be photographed is viewed by sighting through hole 90 out the forward end of the tube. Bracket 86 may be made adjustable vertically on plate 60 to enable the view finder to be used with objects at varying distances.

Explaining now the operation of the camera, it will be noted that there has been provided means whereby enlarged, stereoscopically related pictures are formed, using a stereo base line less than the interaxial separation of the camera lenses. Further, there has been provided means whereby the base line may be changed, and whereby the angle of regard of the objective lenses may be shifted.

With reference to FIG. 4, the lines formed by a combination of dots and dashes indicate beams of light as they would travel from an object through the two camera lenses were the prism and lens system 14 not present. It will be noted that on passing through the camera lenses, the beams of light tend to fall toward the outsides of the picture-taking areas of the camera, and that there is considerable divergence of the beams, such as would produce an unnatural stereoscopic effect.

The elongated lines formed by dashes only indicate beams of light traveling from an object spaced the same distance away but passing through the camera lenses after passing through the prism and lens system described, and with the objective lenses swung together. These lines indicate that centered pictures result, and that the divergence of the light beams within the camera is less than the divergence discussed above.

Variation in base line is provided by swinging the objective lenses so that they are moved away from each other. The dotted lines in FIG. 4 illustrate how beams of light travel to the centers of the objectives from an object spaced farther from the camera than the object in the first two instances discussed above, and with the objective lenses facing squarely forward.

While permitting a shorter base line to be used when taking close-ups, the organization disclosed also has the advantage of producing enlargement. Note that the objective and magnifier lenses function like the objective and ocular in a telescope. By using Porro prism assemblies, images formed by the magnifier lenses are erect and unreversed. The prism assemblies enable the use of a long focal length objective, without the camera becoming an unwieldy tool to work with.

If it is desired to take pictures at relatively long range, it is a simple matter to remove prism and lens system 14 from camera box 12. To do this, annular members 62 are screwed out of internally threaded portions 65. The construction obviously enables different lens attachments to be used with the camera box.

While an embodiment of the invention has been described, it is obvious that changes and modifications may be made without departing from the invention. It is desired to cover, not only the embodiment illustrated, but all modifications and variations that would be apparent to one skilled in the art, and that come within the scope of the appended claims.

It is claimed and desired to secure by Letters Patent:

1. In a stereoscopic camera comprising a camera box with a pair of spaced-apart picture-taking areas therein; structure including a pair of objective lenses in front of said picture-taking areas of the camera box, for reducing the stereo base line, and including means whereby the angle of regard of said objective lenses may be shifted; said structure comprising, for each picture-taking area, prism means with offset front and rear faces, one of said objective lenses being front of the front face of the prism means, and pivoted means mounting the objective lens; said pivoted means accommodating swinging of the pair of lenses toward each other about parallel pivot axes disposed perpendicular to the axes of the objective lenses.

2. The camera of claim 1; wherein said pivoted means mounting an objective lens comprises a housing, with the lens mounted by the housing in front of the front face of its prism means; and said housing is pivotable about an axis spaced toward the camera box from the objective lens.

3. In a stereoscopic camera comprising a camera box with a pair of spaced-apart picture-taking areas therein and a camera lens in front of each picture-taking area, a magnifier lens mounted in front of each camera lens, a Porro prism assembly mounted in front of and in the path of light to each of said magnifier lenses, a pair of laterally shiftable objective lenses in front of and in the path of light to said Porro prism assemblies, one in front of each, and a pivoted housing mounting each laterally shiftable objective lens, said pivotable housings for the two lenses being mounted for pivotal movement about axes that parallel each other and that are perpendicular to the axes of the objective lenses, said pivotable housings accommodating swinging of the objective lenses toward each other with the angle of regard of the lenses shifted simultaneously with shifting of the lenses.

References Cited in the file of this patent

UNITED STATES PATENTS

| | | |
|---|---|---|
| 2,765,718 | Beecher | Oct. 9, 1956 |
| 2,803,179 | Donaldson | Aug. 20, 1957 |
| 2,933,992 | Bushnell | Apr. 26, 1960 |